United States Patent [19]
Chen et al.

[11] Patent Number: 6,101,168
[45] Date of Patent: Aug. 8, 2000

[54] METHOD AND APPARATUS FOR TIME EFFICIENT RETRANSMISSION USING SYMBOL ACCUMULATION

[75] Inventors: Tao Chen, San Diego; Joseph P. Odenwalder, Del Mar; Edward G. Tiedemann, Jr., San Diego, all of Calif.; Serge Willenegger, Niederhasli, Switzerland

[73] Assignee: Qualcomm Inc., San Diego, Calif.

[21] Appl. No.: 08/969,319

[22] Filed: Nov. 13, 1997

[51] Int. Cl.[7] .................................................. H04J 13/00
[52] U.S. Cl. ........................................... 370/228; 370/342
[58] Field of Search ..................................... 370/227, 228, 370/335, 342, 479; 714/748–751

[56] References Cited

U.S. PATENT DOCUMENTS

| | | | |
|---|---|---|---|
| 5,084,900 | 1/1992 | Taylor | 375/1 |
| 5,506,865 | 4/1996 | Weaver, Jr. | 375/205 |
| 5,614,914 | 3/1997 | Bolgiano et al. | 342/364 |

FOREIGN PATENT DOCUMENTS

| | | |
|---|---|---|
| 4241618 | 6/1994 | Germany. |
| 9737459 | 10/1997 | WIPO. |
| 9849785 | 11/1998 | WIPO. |

OTHER PUBLICATIONS

"R–RAKE: A Concept Suitable for IMT–2000.", by Mike Ketseoglou, Jan. 5–9, 1998, pp. 1–16.
"Application of R–RAKE in 3rd Generation IS–95", by Mike Ketseoglou, Jan. 5–9, 1998, pp. 3 and 5.
Chase, David "Code Combining—A Maximum–Likelihood Decoding Approach for Combing an Arbitary Number of Noisy Packets" IEEE Transactions on Communications 33(5):385–393, May 1985.

*Primary Examiner*—Melvin Marcelo
*Attorney, Agent, or Firm*—Philip Wadsworth; Thomas R. Rouse; Pavel Kalousek

[57] ABSTRACT

An efficient retransmission of data using symbol accumulation wherein the packet received in error is retransmitted at a lower energy-per-bit level concurrently in the same frame with the new packet. The destination device receives the data transmission and retransmission, demodulate the signal, and separates the received data into the new and retransmitted packet. The destination device then accumulates the energy of the retransmitted packet with the energy already accumulated for the packet received in error and decodes the accumulated packet. The accumulation of the additional energy provided by the subsequent retransmissions improves the probability of a correct decoding. The throughput rate can be improved since the packet received in error is retransmitted concurrently with the transmission of the new data packet. The capacity is maximized since the retransmission of the packet received in error is at a lower energy level than that of the new packet.

20 Claims, 9 Drawing Sheets

METHOD AND APPARATUS FOR TIME EFFICIENT RETRANSMISSION USING SYMBOL ACCUMULATION

BACKGROUND OF THE INVENTION

I. Field of the Invention

The present invention relates to data communication. More particularly, the present invention relates to a novel and improved method and apparatus for the efficient retransmission of data using symbol accumulation.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA has significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention and is incorporated by reference herein. Furthermore, the CDMA system can be designed to conform to the "TIA/EIA/IS-95A Mobile Station-Base Station Compatibility Standard for Dual-Mode Wideband Spread Spectrum Cellular System", hereinafter referred to as the IS-95A standard.

CDMA, by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of improved demodulation using path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

The reverse link refers to a transmission from a remote station to a base station. On the reverse link, each transmitting remote station acts as an interference to other remote stations in the network. Therefore, the reverse link capacity is limited by the total interference which a remote station experiences from other remote stations. The CDMA system increases the reverse link capacity by transmitting fewer bits, thereby using less power and reducing interference, when the user is not speaking.

The forward link refers to a transmission from a base station to a remote station. On the forward link, the transmission power of the base station is controlled for several reasons. A high transmission power from the base station can cause excessive interference with other base stations. Alternatively, if the transmission power of the base station is too low, the remote station can receive erroneous data transmissions. Terrestrial channel fading and other known factors can affect the quality of the forward link signal as received by the remote station. As a result, the base station attempts to adjust its transmission power of signal to each remote station to maintain the desired level of performance at the remote station.

The forward link and reverse link are capable of data transmission at variable data rates. A method for transmitting data in data packets of fixed size, wherein the data source provides data at a variable data rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. Data is partitioned into data packets (or packets) and each data packet is then encoded into an encoded packet. Typically, the encoded packets are of a predetermined duration. For example, in accordance with the IS-95A standard for the forward link, each encoded packet is 20 msec wide and, at the 19.2 Ksps symbol rate, each encoded packet contains 384 symbols. A rate ½ or a rate ¾ convolutional encoder is used to encode the data, depending on the application. Using a rate ½ encoder, the data rate is approximately 9.6 Kbps. At the 9.6 Kbps data rate, there are 172 data bits, 12 cyclic redundancy check (CRC) bits and 8 code tail bits per data packet.

At lower data rates, such as 4.8 Kbps, 2.4 Kbps, or 1.2 Kbps, the code symbols within the encoded packet is repeated $N_s$ number of times to maintain a constant 19.2 Ksps symbol rate. Symbol repetition is performed to provide time diversity which improves the decoding performance in an impaired channel. To minimize the transmission power and increase system capacity, the transmission power level of each symbol is scaled in accordance with the repetition rate $N_s$.

In accordance with the IS-95A standard, each data packet is block encoded with a CRC polynomial and then convolutionally encoded. The encoded packet is transmitted from the source device to the destination device. At the destination device, the received packet is demodulated and convolutionally decoded with a Viterbi decoder. The decoded data is then checked by a CRC checker to determine if the received packet has been decoded correctly or in error. The CRC check is only able to determine whether an error within the decoded packet is present. The CRC check is not able to correct the error. Therefore, another mechanism is required to allow correction of the data packets received in error.

SUMMARY OF THE INVENTION

The present invention is a novel and improved method and apparatus for the efficient retransmission of data using symbol accumulation. In the present invention, data transmission occurs from a source device to a destination device in the nominal manner. The destination device receives the data transmission, demodulates the signal, and decodes the data. In the exemplary embodiment, the data is partitioned into data packets which are transmitted within one frame time period. As part of the decoding process, the destination device performs the CRC check of the data packet to determine whether the packet was received in error. In the exemplary embodiment, if the packet was received in error, the destination device transmits a NACK message to the source device.

In the exemplary embodiment, the source device responds to the NACK message by retransmitting the packet received in error concurrently with the transmission of the new data packet. The destination device receives the data transmission and retransmission, demodulates the signal, and separates the received data into the new packet and the retransmitted packet. The destination device then accumulates the energy of the received retransmitted packet with the energy already accumulated by the destination device for the packet received in error. The destination device then attempts to decode the accumulated data packet. The accumulation of the additional energy provided by the subsequent retransmissions improves the probability of a correct decoding. Alternately, the destination device can decode the retransmitted packet by itself without combining the two packets. In both cases, the throughput rate can be improved since the packet received in error is retransmitted concurrently with the transmission of the new data packet.

It is an object of the present invention to maintain the throughput rate of a communication system in the presence of channel impairments. In the exemplary embodiment, a data packet which is received in error is retransmitted by the source device concurrently with the new data packet within the same time period. Alternately, the packet received in error can be retransmitted on an additional traffic channel which is independent of the traffic channel used to transmit the new packet. Since the retransmitted packet does not delay or impede the transmission of the new packet, the throughput rate is maintained during the retransmission of the packet received in error.

It is another object of the present invention to maximize the capacity of the communication channel by retransmitting the packet received in error with the minimum amount of energy such that the accumulation of the energy of the transmission and retransmission results in the correct decoding of the packet. The packet received in error can be retransmitted with less energy-per-bit than the new packet which is transmitted for the first time. At the destination device, the energy of each symbol in the packet received in error is accumulated with the energy of each symbol in the retransmitted packet. The accumulated symbols are then decoded.

It is yet another object of the present invention to improve the performance of the decoding of the packets received in error by performing the maximal ratio combining of the transmitted and retransmitted packets. For a communication system which supports coherent demodulation with the use of a pilot signal, the destination device performs a dot product of the received symbols with the pilot signal. The dot product weighs each symbol in accordance with the signal strength of the received signal and results in the maximal ratio combining. Within a transmission or a retransmission, the scalar values from each dot product circuit which has been assigned to a signal path are coherently combined to obtain combined scalar values. The combined scalar values from multiple transmission and retransmissions are also coherently combined. The dot product and coherent combination improve the performance of the subsequent decoding step. For a communication system which does not transmit a pilot signal, the symbols from multiple transmission and retransmissions are scaled according to the received signal-to-noise ratios of the received transmission or retransmissions before accumulation.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

For simplicity, the following discussion details the transmission and retransmission of data packets from a source device to a destination device without regard to whether the source device is a base station 4 or a remote station 6. The present invention is equally applicable for data transmission by base station 4 on the forward link and data transmission by remote station 6 on the reverse link.

I. Circuit Description

Figure 1:
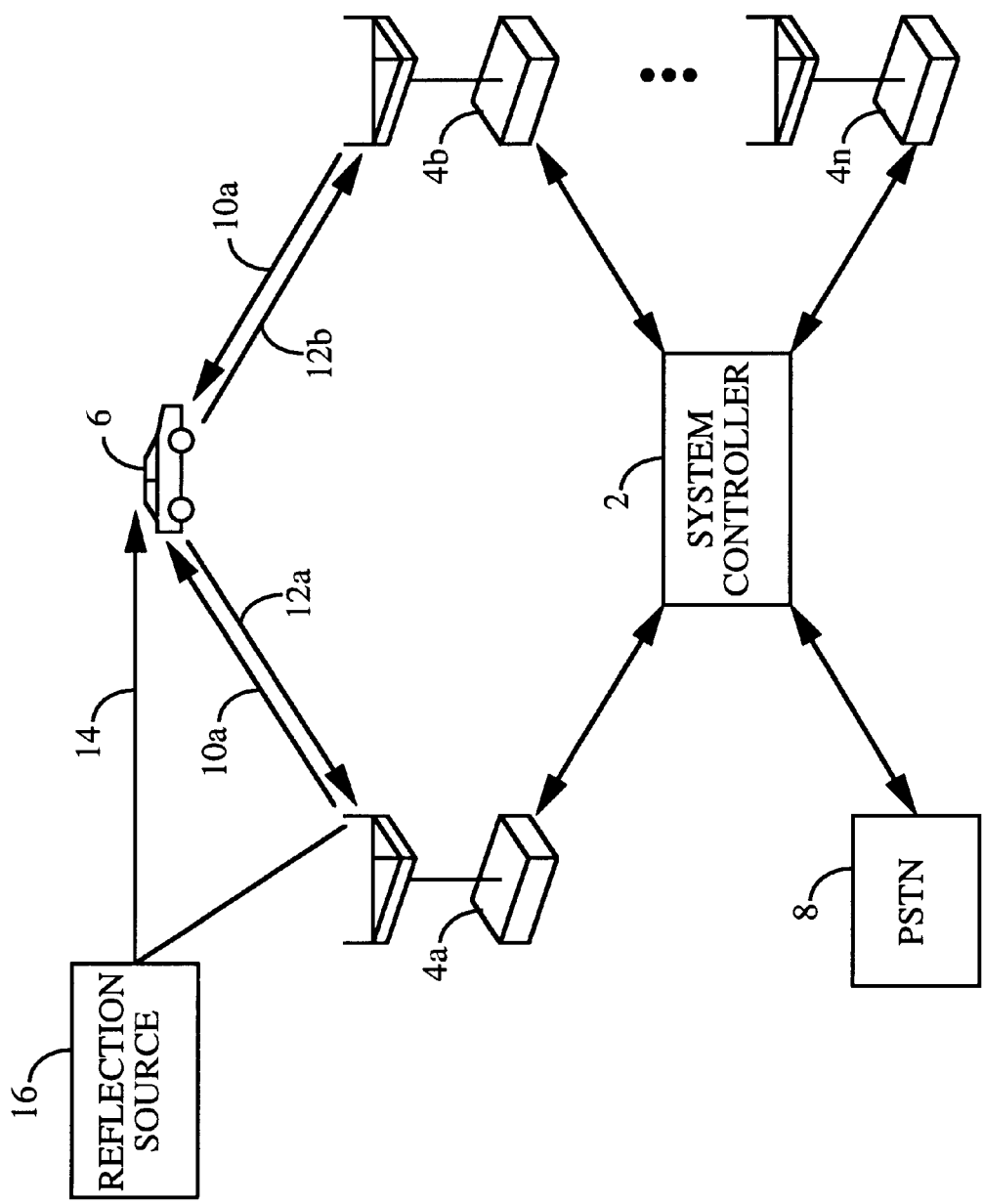
FIG. 1 is an exemplary diagram of the communication system of the present invention showing a plurality of base stations in communication with a remote station.

Referring to the figures, FIG. 1 represents an exemplary communication system of the present invention which is composed of multiple base stations 4 in communication with multiple remote stations 6 (only one remote station 6 is shown for simplicity). System controller 2 connects to all base stations 4 in the communication system and the public switched telephone network (PSTN) 8. System controller 2 coordinates the communication between users connected to PSTN 8 and users on remote stations 6. Data transmission from base station 4 to remote station 6 occurs on the forward link through signal paths 10 and transmission from remote station 6 to base station 4 occurs on the reverse link through signal paths 12. The signal path can be a straight path, such as signal path 10a, or a reflected path, such as signal path 14. Reflected path 14 is created when the signal transmitted from base station 4a is reflected off reflection source 16 and arrives at remote station 6 through a different path than the straight path. Although illustrated as a block in FIG. 1, reflection source 16 is an artifact in the environment in which remote station 6 is operating, e.g. a building or other structures.

Figure 2:
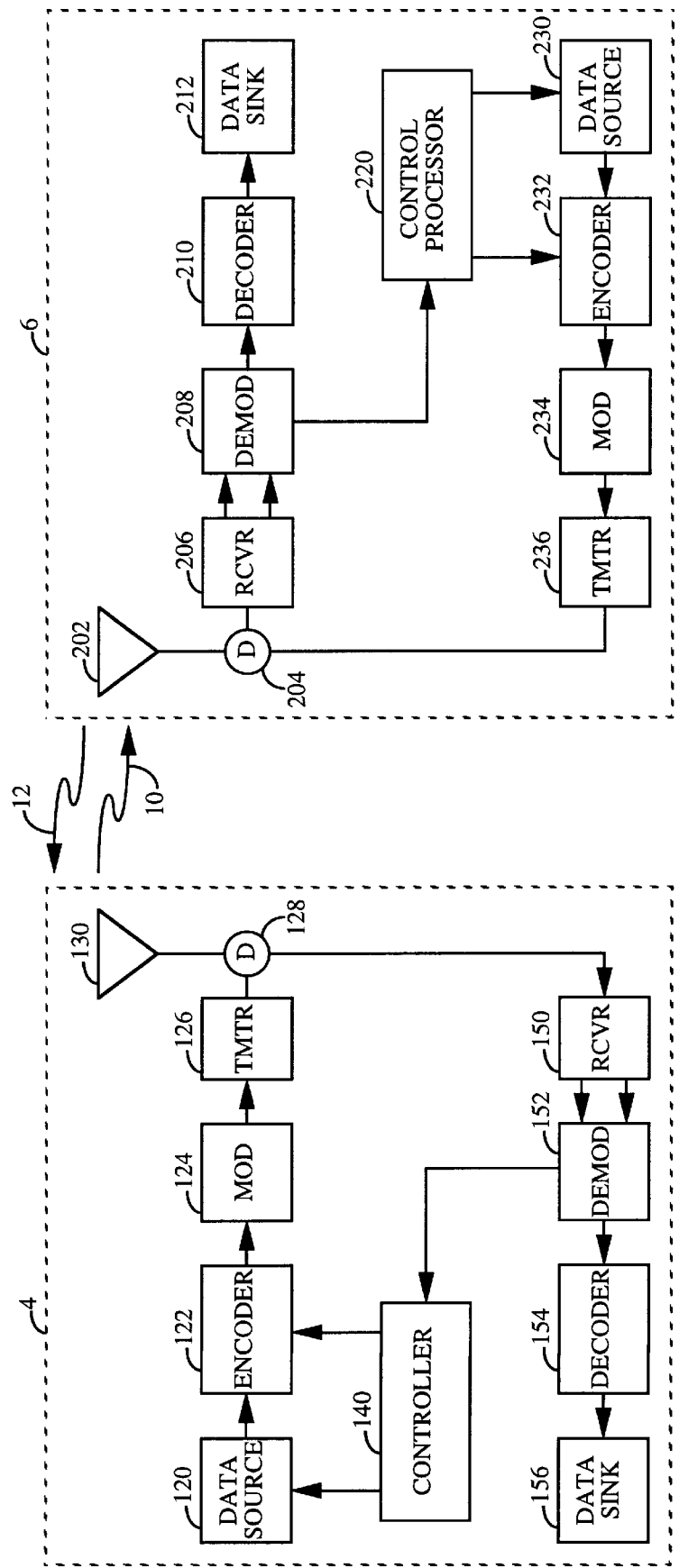
FIG. 2 is a block diagram of an exemplary base station and an exemplary remote station.
Figure 3:
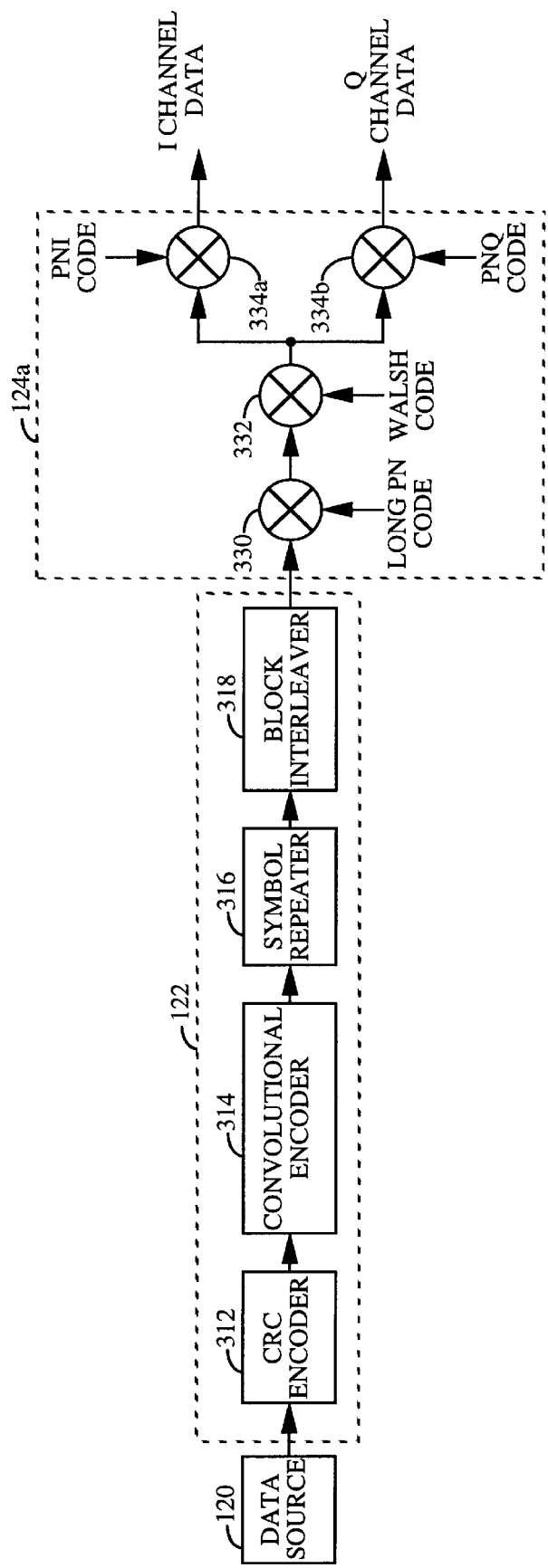
FIG. 3 is a block diagram of an exemplary forward traffic channel transmission system.

An exemplary block diagram of base station 4 and remote station 6 of the present invention is shown in FIG. 2. Data transmission on the forward link originates from data source 120 which provides the data, in data packets, to encoder 122. An exemplary block diagram of encoder 122 is shown in FIG. 3. Within encoder 122, CRC encoder 312 block encodes the data with a CRC polynomial which, in the exemplary embodiment, conforms to the IS-95A standard.

CRC encoder 312 appends the CRC bits and inserts a set of code tail bits to the data packet. The formatted data packet is provided to convolutional encoder 314 which convolutionally encodes the data and provides the encoded data packet to symbol repeater 316. Symbol repeater 316 repeats the encoded symbols $N_s$ times to provide a constant symbol rate at the output of symbol repeater 316 regardless of the data rate of the data packet. The repeated data is provided to block interleaver 318 which reorders the symbols and provides the interleaved data to modulator (MOD) 124. A block diagram of an exemplary modulator 124a is shown if FIG. 3. Within modulator 124a, the interleaved data is spread by multiplier 330 with the long PN code which identifies the remote station 6 to which the data is transmitted. The long PN spread data is provided to multiplier 332 which covers the data with the Walsh code corresponding to the traffic channel assigned to remote station 6. The Walsh covered data is further spread with the short PNI and PNQ codes by multipliers 334a and 334b. The short PN spread data is provided to transmitter (TMTR) 126 (see FIG. 2) which filters, modulates, and amplifies the signal. The modulated signal is routed through duplexer 128 and transmitted from antenna 130 on the forward link through signal path 10.

Figure 4:
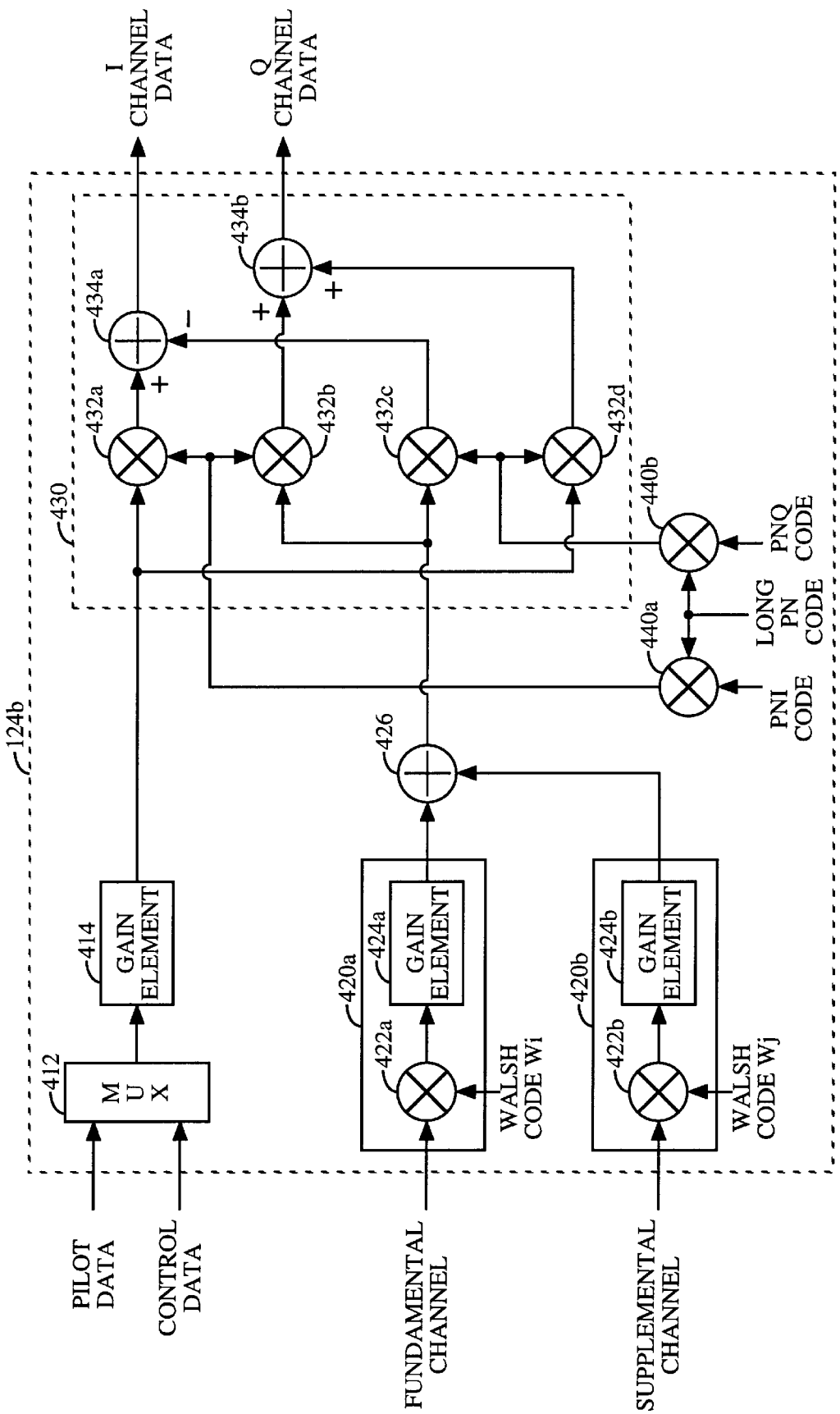
FIG. 4 is an exemplary block diagram of an alternative modulator.

A block diagram of an alternative modulator 124b is shown in FIG. 4. In this embodiment, data source 120 provides data packets to two encoders 122 which encode the data as described above. The interleaved data and the pilot and control data are provided modulator 124b. Within modulator 124b, the interleaved data from the first encoder 122 is provided to Walsh modulator 420a and the interleaved data from the second encoder 122 is provided to Walsh modulator 420b. Within each Walsh modulator 420, the data is provided to multiplier 422 which covers the data with a Walsh code assigned to that Walsh modulator 420. The covered data is provided to gain element 424 which scales the data with a scaling factor to obtain the desired amplitude. The scaled data from Walsh modulators 420a and 420b are provided to summer 426 which sums the two signals and provides the resultant signal to complex multiplier 430. The pilot and control data are provided to multiplexer (MUX) 412 which time multiplexes the two data and provides the output to gain element 414. Gain element 414 scales the data to obtain the desired amplitude and provides the scaled data to complex multiplier 430.

Within complex multiplier 430, the data from gain element 414 is provided to multipliers 432a and 432d and the data from summer 426 is provided to multipliers 432b and 432c. Multipliers 432a and 432b spread the data with the spreading sequence from multiplier 440a and multipliers 432c and 432d spread the data with the spreading sequence from multiplier 440b. The output of multipliers 432a and 432c are provided to summer 434a which subtracts the output of multiplier 432c from the output of multiplier 432a to provide the I channel data. The output of multipliers 432b and 432d are provided to summer 434b which sums the two signals to provide the Q channel data. The spreading sequences from multipliers 440a and 440b are obtained by multiplying the PNI and PNQ codes with the long PN code, respectively.

Although modulator 124b as shown in FIG. 4 support transmission of two traffic channels which are labeled as the fundamental channel and the supplemental channel, modulator 124b can be modified to facilitate transmission of additional traffic channels. In the description above, one encoder 122 is utilized for each traffic channel. Alternatively, one encoder 122 can be utilized for all traffic channels, with the output of encoder 122 demultiplexed into multiple data streams, one data stream for each traffic channel. Various modifications of the encoder and modulator as described above can be contemplated and are within the scope of the present invention. A base station controller 140 supervises the operation of the base station 4. At remote station 6 (see FIG. 2), the forward link signal is received by antenna 202, routed through duplexer 204, and provided to receiver (RCVR) 206. Receiver 206 filters, amplifies, demodulates, and quantizes the signal to obtain the digitized I and Q baseband signals. The baseband signals are provided to demodulator (DEMOD) 208. Demodulator 208 despreads the baseband signals with the short PNI and PNQ codes, decovers the despread data with the Walsh code identical to the Walsh code used at base station 4, despreads the Walsh decovered data with the long PN code, and provides the demodulated data to decoder 210.

Figure 8:
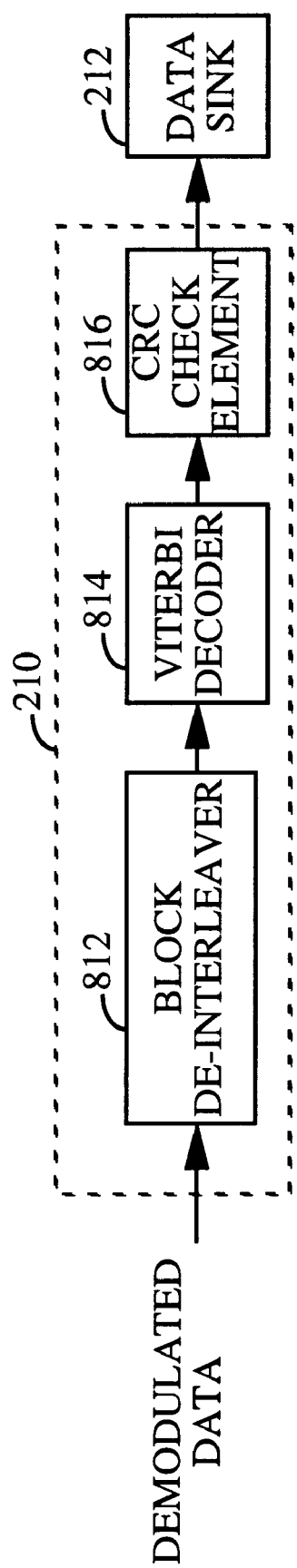
FIG. 8 is a block diagram of an exemplary decoder within the remote station.

Within decoder 210 which is shown in FIG. 8, block de-interleaver 812 reorders the symbols within the demodulated data and provides the de-interleaved data to Viterbi decoder 814. Viterbi decoder 814 convolutionally decodes the de-interleaved data and provides the decoded data to CRC check element 816. CRC check element 816 performs the CRC check and conditionally provides the checked data to data sink 212.

Figure 9:
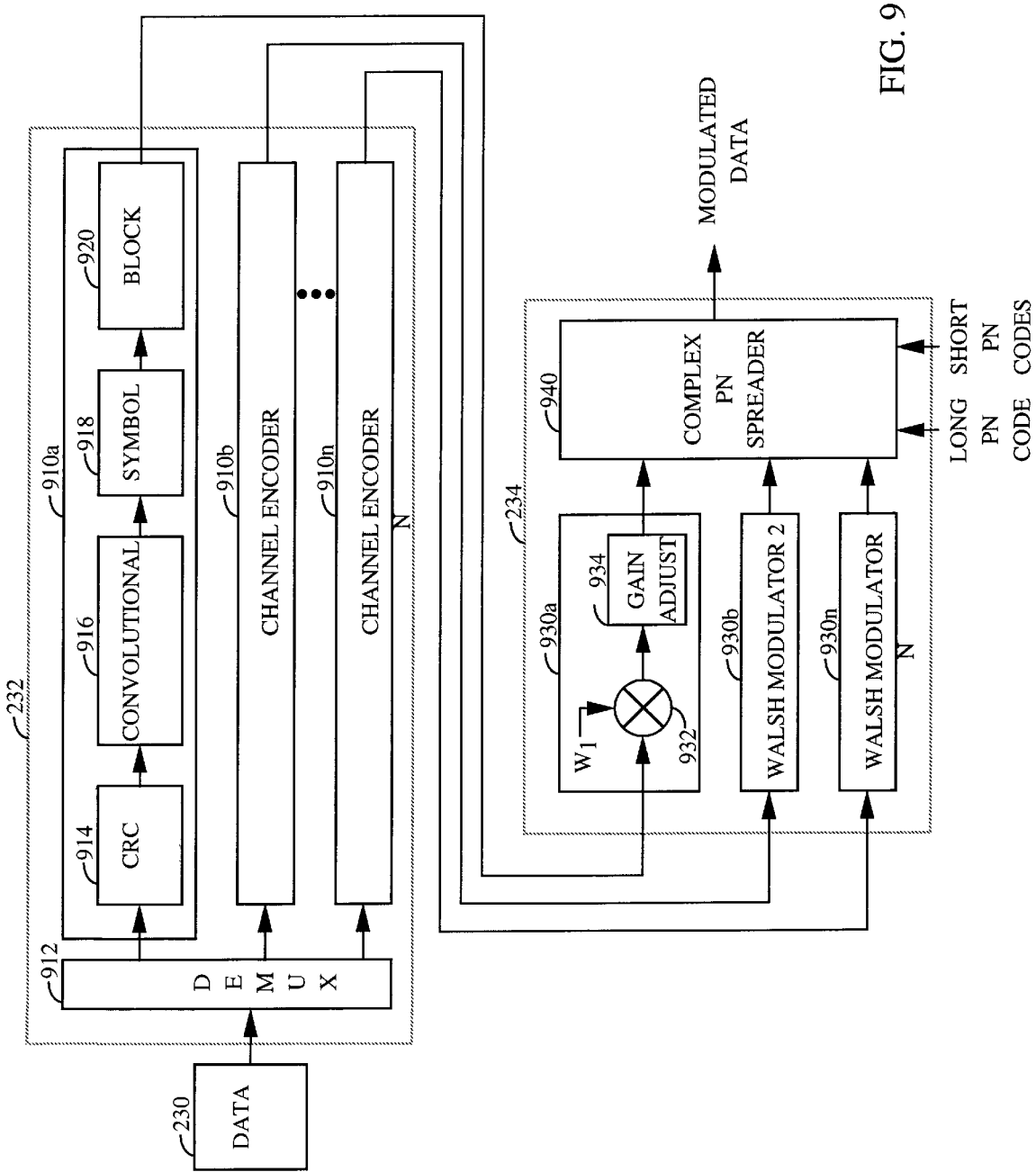
FIG. 9 is a block diagram of an exemplary architecture which supports data transmission over multiple code channels.

Data transmission from remote station 6 to base station 4 on the reverse link can occur in one of several embodiments. In the first embodiment, the reverse link transmission can occur over multiple orthogonal code channels similar to the structure used for the forward link. The exemplary embodiment of a remote transmission system which supports multiple code channels on the reverse link is described in detail in U.S. patent application No. 08/654,443, entitled "HIGH DATA RATE CDMA WIRELESS COMMUNICATION SYSTEM", filed May 28, 1996, now U.S. Pat. No. 5,930,230 assigned to the assignee of the present invention and incorporated by reference herein. A simplified block diagram of the structure is shown in FIG. 9. Data source 230 provides the data, in data packets, through DEMUX 912 to channel encoders 910. Within each channel encoder 910, CRC encoder 914 block encodes the data packet then appends the CRC bits and a set of code tail bits to the data. The formatted data packet is provided to convolutional encoder 916 which convolutionally encodes the data and provides the encoded data packet to symbol repeater 918. Symbol repeater 918 repeats the symbols with the encoded data packet $N_s$ times to provide a constant symbol rate at the output of symbol repeater 918 regardless of the data rate. The repeated data is provided to block interleaver 920 which reorders the symbols within the repeated data and provides the interleaved data to modulator (MOD) 234.

Within modulator 234, the interleaved data from each channel encoder 910 is provided to a Walsh modulator 930. Within Walsh modulator 930, the interleaved data is covered by multiplier 932 with the Walsh code which identifies the code channel of the set of code channels transmitted by the remote station on which the data is transmitted. The Walsh covered data is provided to gain adjust 934 which amplifies the data with the desired gain setting for the code channel. The outputs from Walsh modulators 930 are provided to complex PN spreader 940 which spreads the Walsh covered data with the long PN code and the short PN codes. The modulated data is provided to transmitter 236 (see FIG. 2) which filters, modulates, and amplifies the signal. The modulated signal is routed through duplexer 204 and transmitted from antenna 202 on the reverse link through signal path 12. A more detailed description of the reverse link architecture can be obtained from the aforementioned U.S. patent application No. 08/654,443.

In the second embodiment, the reverse link is defined in accordance with the IS-95A standard. In essence, the reverse link transmission by remote station 6 is defined in accordance with the temporal offset of a common long PN sequence generator. At two differing offsets the resulting modulation sequences are uncorrelated. The offset of each remote station 6 is determined in accordance with a unique numerical identification of the remote station 6, which in the exemplary embodiment of an IS-95A remote station 6 is the electronic serial number (ESN). Thus, each remote station 6 transmits on one uncorrelated reverse link channel determined in accordance with its unique electronic serial number.

The reverse link structure of the second embodiment is fully described in the aforementioned U.S. Pat. No. 4,901,307. In summary, the data packets are provided by data source 230 to encoder 232 which encodes the data packets with a CRC block code and a convolutional code. The encoded data is repeated to maintain a constant symbol rate regardless of the data rate. Six symbols of encoded data are mapped into a 64-bit Walsh symbol. The mapped signal is spread by the long PN code and the short PN codes. The modulated data is provided to transmitter 236 which performs the same function as that described in the first embodiment.

The aforementioned operation of the remote station 6 is supervised by a control processor 220.

The reverse link signals propagating through path 12 are received at the base station 4 by the antenna 130, routed through the duplexer 128, and provided to a receiver (RCVR) 150. The receiver 150 filters, amplifies, demodulates, and quantizes the signal to obtain the digitized I and Q baseband signals. The baseband signals are provided to a demodulator (DEMOD) 152. The demodulator 152 demodulates the baseband signals in accordance with the modulation scheme used on the reverse link. The modulator 152 then provides the demodulated data to a decoder 154. The decoder 154 is configured to provide the function essentially the same as the function of the decoder 210. The decoder 154 provides the decoded data to a data sink 156.

II. Demodulation of the Data Symbols

Figure 6:
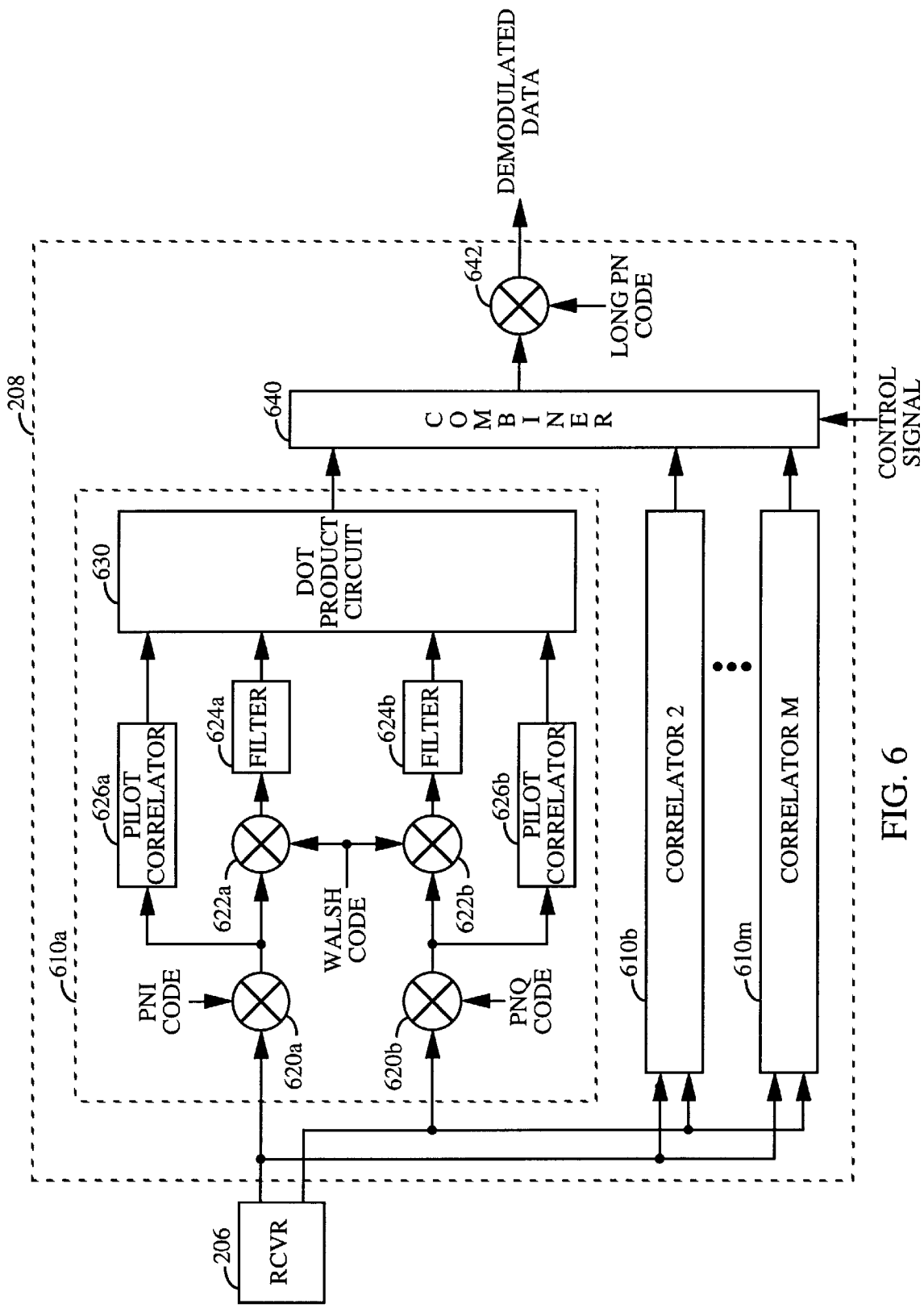
FIG. 6 is a block diagram of an exemplary demodulator within the remote station.

An exemplary block diagram illustrating the circuit for demodulating the received signal is shown in FIG. 6. The digitized I and Q baseband signals from receiver 150 or 206 are provided to a bank of correlators 610. Each correlator 610 can be assigned to a different signal path from the same source device or a different transmission from a different source device. Within each assigned correlator 610, the baseband signals are despread with the short PNI and PNQ codes by multipliers 620. The short PNI and PNQ codes within each correlator 610 can have a unique offset corresponding to the propagation delay experienced by the signal being demodulated by that correlator 610. The short PN despread data is decovered by multipliers 622 with the Walsh code assigned to the traffic channel being received by the correlator 610. The decovered data is provided to filters 624 which accumulate the energy of the decovered data over a Walsh symbol period.

The short PN despread data from multipliers 620 also contains the pilot signal. In the exemplary embodiment, at the source device, the pilot signal is covered with the all zero sequence corresponding to Walsh code 0. In the alternative embodiment, the pilot signal is covered with an orthogonal pilot sequence as described in copending U.S. patent application Ser. No. 08/925,521, entitled "METHOD AND APPARATUS FOR PROVIDING ORTHOGONAL SPOT BEAMS, SECTORS, AND PICOCELLS", filed Sep. 8, 1997, assigned to the assignee of the present invention and incorporated by reference herein. The short PN despread data is provided to pilot correlator 626 which perform pilot decovering, symbol accumulation, and lowpass filtering of the despread data to remove the signals from other orthogonal channels (e.g. the traffic channels, paging channels, access channels, and power control channel) transmitted by the source device. If the pilot is covered with Walsh code 0, no Walsh decovering is necessary to obtain the pilot signal.

Figure 7:
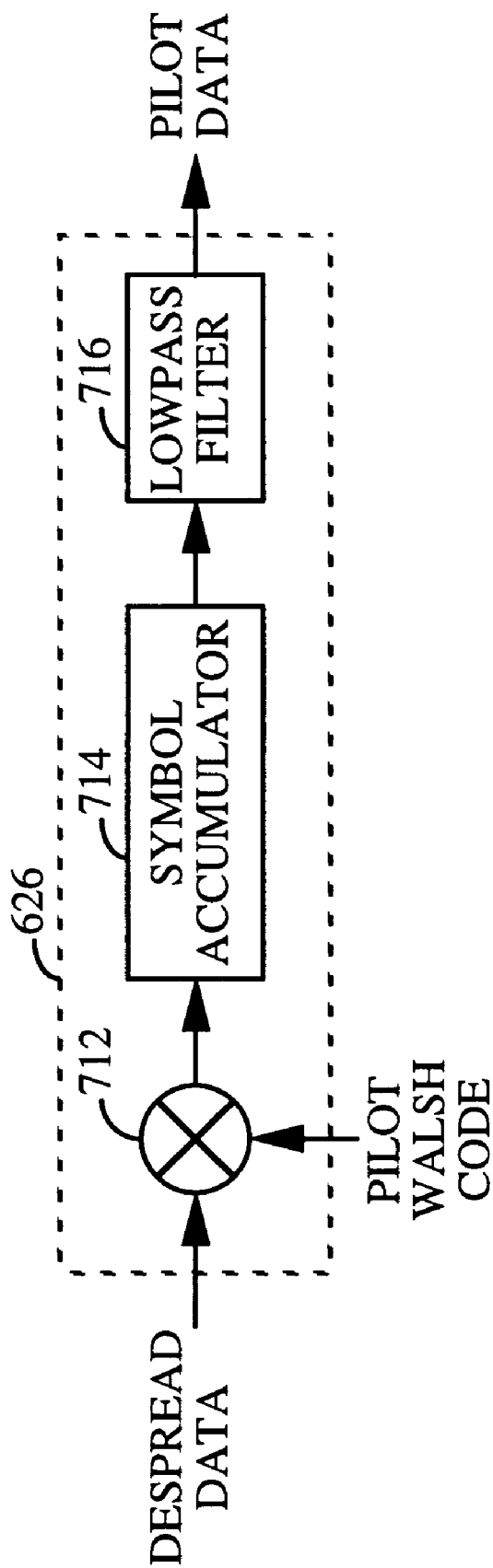
FIG. 7 is a block diagram of an exemplary pilot correlator.

A block diagram of an exemplary pilot correlator 626 is shown in FIG. 7. The despread data from multiplier 620 is provided to multiplier 712 which decovers the despread data with the pilot Walsh sequence. In the exemplary embodiment, the pilot Walsh sequence corresponds to Walsh code 0. However, other orthogonal sequences and be utilized and are within the scope of the present invention. The decovered data is provided to symbol accumulator 714. In the exemplary embodiment, symbol accumulator 714 accumulates the decovered symbols over the length of the pilot Walsh sequence which, for IS-95 Walsh sequence, is 64 chips in duration. The accumulated data is provided to lowpass filter 716 which filters the data to remove noise. The output from lowpass filter 716 comprises the pilot signal.

The two complex signals (or vectors) corresponding to the filtered pilot signal and the filtered data symbols are provided to dot product circuit 630 which computes the dot product of the two vectors in a manner well known in the art. In the exemplary embodiment, dot product circuit 630 is described in detail in U.S. Pat. No. 5,506,865, entitled "PILOT CARRIER DOT PRODUCT CIRCUIT", assigned to the assignee of the present invention and incorporated by reference herein. Dot product circuit 630 projects the vector corresponding to the filtered data symbol onto the vector corresponding to the filtered pilot signal, multiplies the amplitude of the vectors, and provides a signed scalar value to combiner 640.

The pilot signal from each correlator 610 reflects the signal strength of the signal path received by that correlator 610. Dot product circuit 630 multiplies the amplitude of the vector corresponding to the filtered data symbols, the amplitude of the vector corresponding to the filtered pilot signal, and the cosine of the angle between the vectors. Thus, the output from dot product circuit 630 corresponds to the energy of the received data symbol. The cosine of the angle between the vectors (e.g., the angle of the pilot minus the angle of the traffic) weighs the output in accordance with the noise in both pilot and traffic vectors.

Combiner 640 receives the scalar values from each correlator 610 which has been assigned to a signal path and combines the scalar values. In the exemplary embodiment, combiner 640 coherently combines the scalar values for each received symbol. An exemplary embodiment of combiner 640 is described in detail in U.S. Pat. No. 5,109,390, entitled "DIVERSITY RECEIVER IN A CDMA CELLULAR TELEPHONE SYSTEM", assigned to the assignee of the present invention and incorporated by reference herein. Coherent combination takes into account the sign of the scalar output from each correlator 610 and results in the maximal ratio combining of the received symbols from different signal paths. The combined scalar value from combiner 640 is represented as an m-bit soft decision value for subsequent demodulation and decoding. The soft decision values are provided to multiplier 642 which despreads the soft decision values with the long PN code to produce the demodulated data. The demodulated data is decoded in the manner described above.

In a communication system in which the pilot signal is not transmitted by the source device, the dot product is not performed. Combiner 640 simply combines the measured amplitude (or energy) of the received signal from filters 624.

III. Acknowledgment Procedures

With the CRC check, the destination device is able to determine whether the data packet was received in a condition capable of correction by the Viterbi decoder. In the present invention, one of a number of protocols can be used to control the retransmission of packets received in error. The following embodiments list some of the methods that can be used. Other methods are extensions of the present invention and are within the scope of the present invention.

In the first embodiment, the destination device acknowledges every received packet and sends an ACK message back to the source device if the packet is received correctly or a NACK message if the packet is received in error. For each transmitted packet, the source device monitors the ACK and NACK messages and retransmits the packets received in error. In this embodiment, the source device can retransmit a packet if an ACK or NACK message for that packet is not received within a predetermined time period. Furthermore, the source device can terminate the retransmission of a packet if an ACK or NACK message is not received after a predetermined number of retransmissions.

In the second embodiment, the destination device acknowledges every received packet with an ACK or NACK message as in the first embodiment. The messages are sent by the destination device in an ordered manner to the source device. Therefore, if the source device recognizes that a message has not been received for a packet, the source device retransmits that packet. For example, if the source device receives a message for packet i+1 but has not received a message for packet i, then the source device realizes that either packet i or the message for packet i was not received properly. Therefore, the source device retransmits packet i. The second embodiment is an extension of the first embodiment which can be used to speed up the retransmission process.

In the third embodiment, the destination device acknowledges only packets which are received in error with the NACK messages. The source device only retransmits a packet if a NACK message is received. The destination device can retransmit the NACK message (e.g., if a retransmission has not been received correctly after a predetermined time period).

IV. Data Retransmission

In the exemplary embodiment, if a packet was received in error, the destination device transmits a NACK message back to the source device. The packet received in error can be retransmitted concurrently with the new packet in the current frame or at a subsequent frame. Preferably, the packet received in error is retransmitted in the current frame to minimize processing delays. In the exemplary embodiment, the retransmitted packet comprises the identical code symbols which were transmitted previously. In the alternative embodiment, the retransmitted packet comprises new code symbols.

Figure 5:
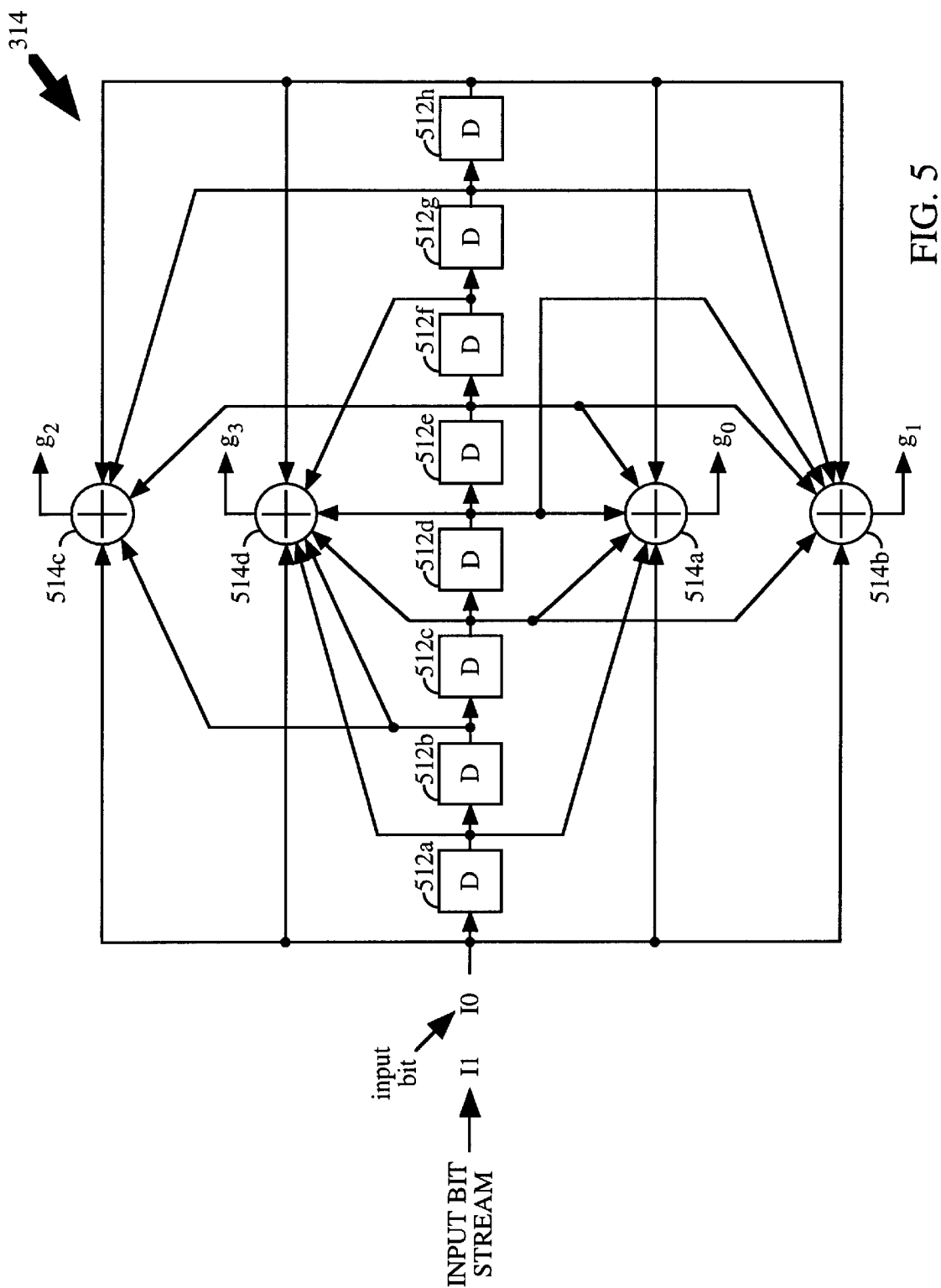
FIG. 5 is a block diagram of an exemplary convolutional encoder.

A block diagram of an exemplary convolutional encoder 314 of the present invention is shown in FIG. 5. In the exemplary embodiment, convolutional encoder 314 is a constraint length K=9 encoder, although other constraint lengths can also be utilized. The input bits are provided to (K−1) delay elements 512. The outputs from selected delay elements 512 are provided to a set of summers 514 which perform modulo two addition of the inputs to provide the generator output. For each summer 514, the delay elements 512 are selected based on a polynomial which is carefully chosen for high performance.

In the exemplary embodiment wherein the retransmitted packet comprises the identical code symbols which were transmitted previously, convolutional encoder 314 is designed for the necessary code rate. For example, for a rate ½ convolutional encoder 314, only two generators (e.g., g0 and g1 from summers 514*a* and 514*b*, respectively) are necessary and the remaining generators can be omitted. At the receiver, the code symbols for the retransmitted packets can be combined with the corresponding code symbols from prior transmissions or can replace those prior transmitted symbols. The increased energy from symbol accumulation results in improved decoding performance at the receiver.

In the alternative embodiment wherein the retransmitted packet comprises new code symbols which may not have been transmitted previously, convolutional encoder 314 is designed to produce code symbols at various code rates. Referring to FIG. 5, for an exemplary rate ½ convolutional encoder 314, each input bit results in two output code symbols (e.g., from generators g0 and g1). The original transmission can comprise the code symbols for the original code rate (e.g., code symbols from generator g0 and g1 for rate ½). If this packet is received in error, the retransmitted packet can comprise the code symbols from other generators which have not been transmitted previously (e.g., generators g2 and/or g3). At the receiver, the code symbols for the retransmitted packets are interleaved (not combined) with the corresponding code symbols from prior transmissions. The Viterbi decoder then decodes the accumulated packet (comprising the code symbols from the transmitted and retransmitted packets) using a code rate corresponding to the accumulated packet. As an example, assume the original transmission utilizes rate ½ and the Viterbi decoder originally decodes using rate ½. Assume further that the packet was received in error. The retransmitted packet can comprise the code symbols from generator g2. In this case, the Viterbi decoder would decode the received codes symbols from generators g0, g1, and g2 using rate ⅓. Similarly, if the accumulated packet is decoded in error, an additional retransmitted packet comprising codes symbols from generator g3 can be transmitted and the Viterbi decoder would decode the accumulated packet comprising codes symbols from generators g0, g1, g2 and g3 using rate ¼. The lower code rates provide enhanced error correcting capabilities over the original rate ½.

Other code rates can also be generated by using punctured codes and are within the scope of the present invention. Punctured codes are thoroughly treated by J. Cain, G. Clark, and J. Geist in "Punctured Convolutional Codes of Rate (n−1)/n and Simplified Maximum Likelihood Decoding," IEEE Transaction on Information Theory, IT-25, pgs. 97–100, January 1979. As an example, the original transmission can comprise the code symbols from generators g0 and g1 for rate ½ and the retransmission can comprise code symbols from generators g2 and g3 which have been punctured to rate ¾. The accumulated packet from both transmissions would comprise code symbols from generators g0, g1, g2 and g3 having a punctured rate 3/10. Puncturing reduces the number of code symbols to be retransmitted but also reduces the error correcting capability of the convolutional code.

In communication systems wherein the symbol rate can not be increased to accommodate the additional retransmitted symbols, the source device can change the code rate of the convolutional encoder to decrease the number of code symbols needed for the new packet. The saving in code symbols can then be used for the retransmitted packet. For example, a data packet comprising 192 bits can be encoded nominally using a rate ½ code to generate 384 code symbols. To retransmit a packet concurrently with the transmission of a new packet, the new packet can be encoded with a rate ¾ code, resulting in the generation of 256 code symbols. The remaining 128 code symbols can comprise the retransmitted packet.

Using this scheme whereby the code rate of the new packet can be adjusted, it may be possible to operate symbol repetition in the nominal manner. Since the code rate is decreased, a higher operating $E_s/I_o$ is probably required to maintain the same level of performance. The transmission power level can be adjusted such that the $E_s$ of each symbol is increased to maintain the requisite level of performance. This scheme is especially useful to avoid additional delay when the data rate of the new packet is at full rate.

The source device can retransmit the packet received in error in one of many embodiments. In the first embodiment, the retransmission is achieved by substituting the repeated symbols for the new packet with the code symbols for the retransmitted packet. For example, if there are 384 symbols in a frame and 288 of the symbols are repeated, then these 288 symbols can be used for the code symbols for the retransmitted packet. At least 96 symbols are reserved for the code symbols for the new packet. If the retransmitted packet improves the decoding by the destination device and results in an error free data packet, then the retransmission does not degrade the throughput rate even in the presence of errors in the channel.

The probability of a packet received in error is dependent on the quality, as measured by the energy-per-bit-to-noise-plus-interference ratio ($E_s/I_o$), of the received signal and the variation of the signal quality over time. The energy-per-bit $E_s$ is determined by the amount of energy received over a symbol period. If the repeated symbols are used for the code symbols for the retransmitted packet, the symbol periods for the new symbols and the retransmitted symbols are shortened correspondingly. If the transmission power is maintained at the same level by the source device, the $E_s$ will be lower for each new and retransmitted symbol and can result in a higher error rate. To maintain the same $E_s$ over a shorter symbol period, the transmission power level of the symbols is increased. In fact, the transmission power level can be increased such that the $E_s$ is higher than nominal to compensate for the loss in time diversity that results from not repeating the symbols.

The transmission power level can be increased by the same amount for the new and retransmitted symbols, or by different amounts. This choice is determined by system considerations. If the transmission power level is increased sufficiently for the retransmitted symbols, the destination device can decode the retransmitted packet without regard to the original packet which was received in error. However, higher transmission power consumes system resources and can decrease the system capacity. In the preferred embodiment, the transmission power level is adjusted such that the $E_s$ for the retransmitted symbols is lower than that of the new symbols. Furthermore, the transmission power level for the retransmitted symbols can be set at or slightly above the minimal level such that the energy of the retransmitted symbols, when combined with the energy already accumulated by the destination device for those symbols, results in the requisite level of performance.

The minimum transmission power level for the retransmitted symbols can be computed as follows. First, the communication system determines the $E_s/I_o$ required for the requisite level of performance. The required $E_s/I_o$ is approximately equal to an $E_s/I_o$ set point maintained by the power control loop. The power control loop adjusts the transmission power to maintain the quality of the received signal at the $E_s/I_o$ set point. Second, the destination device can measure the signal-to-noise-plus-interference ratio $$\frac{S}{\sqrt{S^2 + N^2}}$$

of the received signal. From $$\frac{S}{\sqrt{S^2 + N^2}},$$

the $E_s/I_o$ of the received packet can be calculated. An exemplary embodiment for measuring the $E_s/I_o$ in a spread spectrum communication system is described in detail in U.S. patent application Ser. No. 08/722,763, entitled "METHOD AND APPARATUS FOR MEASURING LINK QUALITY IN A SPREAD SPECTRUM COMMUNICATION SYSTEM", filed Sep. 27, 1996, now U.S. Pat. No. 5,903,554 assigned to the assignee of the present invention and incorporated by reference herein. The destination device can then compute the additional energy-per-bit $E_s$ from the subsequent retransmission (assuming the same $I_o$) required to increase the measured $E_s/I_o$ of the received signal to the required $E_s/I_o$. The information (e.g. the additional $E_s$) can be transmitted to the source device which adjusts the transmission gain of the retransmitted symbols to obtain the additional $E_s$ required by the destination device. For each retransmission, the destination device can update the received $E_s/I_o$ for the accumulated symbols. The destination device can then recompute the required additional $E_s$ if the decoding still results in a packet error.

In the present invention, symbol repetition is performed only if the data rate of the packet is less than full rate. If the data rate for the new packet is at full rate, there are no repeated symbols which can be used for retransmission of the packet received in error. Therefore, the present invention can be implemented in conjunction with another retransmission protocol at a higher layer. One such scheme is the radio link protocol (RLP) which is defined by the IS-657 standard. The RLP layer can delay the transmission of the new data packet to allow retransmission of the packet received in error.

In the second embodiment, the packet received in error is retransmitted on an additional code channel which is available for transmission to the destination device. One major advantage of this embodiment is that the retransmission of the packet received in error is independent of the transmission of the new packet. Therefore, the number of repetitions, the power level, and the code rate do not need to be changed to accommodate the retransmission. Furthermore, the second embodiment allows the source device to retransmit even if the new packet is a full rate frame (i.e. when no code symbols are repeated in the frame). An additional advantage of the second embodiment is the ease of placing the additional code channel on a quadrature channel from the regular traffic channel to reduce the peak to average amplitude variation which can degrade the system performance. The pilot channel, the regular traffic channel, the power control channel, and the additional code channel can be organized to balance the I and the Q channels in the QPSK or OQPSK modulation.

The various modes of data retransmission described above can be used for retransmission of an entire packet or a partial packet. For some communication systems, it may be possible to monitor the quality of transmission link over the duration of a packet. In the exemplary embodiment, the link quality can be monitored by measuring $E_s/I_o$ in the manner described in the aforementioned U.S. patent application Ser. No. 08/722,763. In this case, it may be more economical to retransmit only the portion of the packet corresponding to the time period when the transmission link quality is poor (e.g., below a predetermined threshold). An indication of the time duration wherein the link quality is poor can be transmitted to the source which then retransmits only that portion of the packet corresponding to the noted time duration. The retransmission of the packets received in error, as described above, is applicable for data retransmission on the forward link and reverse link.

From the above discussion, symbol accumulation as used in this specification refers to the accumulation of the energy of a transmission of a data packet with the energy of one or more retransmissions of an entire or partial packet. Symbol accumulation also refers to the accumulation of identical code symbols (through addition and/or replacement of code symbols and using the same code rate) and the accumulation of different code symbols (through interleaving and using lower code rates).

V. Processing of the Retransmitted Packets

If error correcting coding is used for data transmission, full retransmission of the packet received in error is not required to correctly decode the packet. In the present invention, the destination device decodes the received packet and performs the CRC check to determine whether the packet was received in error. If the packet was received in error, the symbols which comprised the packet received in error are stored for subsequent decoding. In the exemplary embodiment, the storage can be implemented using a storage element or one of any number of memory devices that are known in the art, such as RAM memory devices, latches, or other types of memory devices.

The source device retransmits the packet received in error in one of the methods described above. The destination device receives the retransmitted packet, accumulates energy of the retransmitted packet with the energy already accumulated for the packet received in error, and decodes the accumulated packet. The additional energy of the retransmitted packet increases the likelihood that the accumulated packet can be decoded correctly. The probability of error of the accumulated packet is typically substantially less than the original received packet since a large amount of energy may have been accumulated from the original transmission and the retransmissions.

In the exemplary embodiment, the energy accumulation is performed on a symbol by symbol basis. For each symbol, the combined scalar value (from combiner 640) of the retransmitted symbol is coherently combined with the scalar value which has been accumulated for this data symbol. The accumulation can be accomplished with an arithmetic logic unit (ALU), a microprocessor, a digital signal processor (DSP), or other devices programmed or designed to perform the functions disclosed herein. Again, coherently combining takes into account the sign of the scalar value. Coherent combination performs the maximal ratio combining of the signals received from the transmission and retransmissions. In this regard, the retransmissions can be viewed as the outputs from additional fingers (or correlators 610) of a rake receiver. The retransmissions also provide time diversity for the data transmission.

In the exemplary embodiment, the accumulated scalar value may be manipulated before subsequent demodulation and decoding. The accumulated scalar value of each symbol is a soft decision value which is typically represented as an m-bit signed integer. The soft decision values are eventually provided to Viterbi decoder 814 for decoding. The performance of Viterbi decoder 814 is influenced by the number of bits and the range of the soft decision values. Specifically, for each code branch, the branch metric calculations compares the soft decision values for that code branch to an expected value to obtain a branch metric. The branch metric are then used to defined the maximal likelihood path which results in the decoded bits.

As energy is accumulated for each symbol from the retransmissions, the soft decision values have tendency to increase in value. Therefore, it may be necessary to rescale the soft decision values with a gain factor $A_v$ before Viterbi decoding. Because the soft decision values are derived from an accumulation of energy from multiple transmission and retransmissions, it is preferable to maintain $A_v=1.0$. As the soft decision value increases, the confidence in the correctness of that symbol increases. Rescaling the soft decision value to a smaller value to fit within a range can introduce quantization error and other errors. However, other system factors (e.g. $E_b/I_o$ of the received signal) may dictate that the soft decision values be rescaled for an improved performance. In the exemplary embodiment, the scaling can be performed with an arithmetic logic unit (ALU), a microprocessor, a digital signal processor (DSP), or other devices programmed or designed to perform the function disclosed herein.

Since the branch metric calculation circuit within Viterbi decoder 814 is typically designed with a predetermined number of bits, it is probably necessary to clip the soft decision values. To maintain accuracy, the accumulated scalar values can be stored as unclipped values and the clipping can be done prior to the Viterbi decoding step.

In a system architecture wherein the pilot signal is not transmitted concurrently with the data transmission, the combination of the data symbols from the transmission and retransmissions is accomplished by another embodiment. An example of such architecture is the reverse link implementation which conforms to the IS-95A standard. It is preferable to accumulated the scalar values according to the signal-to-noise ratio (S/N) of the received signals. At the destination device, the energy S of the desired signal (e.g. the retransmitted packet) can be computed after the despreading with the long PN code and the short PN codes. The total energy of the received signal can be computed and represented as $$\sqrt{S^2 + N^2}.$$

Since the received signal is predominantly, comprised of the interference (e.g. N>>S), N is approximately equal to $$\sqrt{S^2 + N^2}.$$

Thus, the destination device accumulates the scalar values from the transmission and retransmissions according to the equation:

$$y_i = \sum \frac{\bar{s}_{ij}}{|N_{ij}|} \approx \sum \frac{|\bar{s}_{ij}|}{\left(\sqrt{S^2 + N^2}\right)_j}, \quad (1)$$

where $y_i$ is the accumulated scalar value for the $i^{th}$ symbol, $\bar{s}_{ij}$ is the vector of the desired signal for the $i^{th}$ symbols of the $j^{th}$ transmission, $|\bar{s}_{ij}|$ is the scalar value from filter 624 for the $i^{th}$ symbols of the $j^{th}$ transmission, and $$\left(\sqrt{S^2 + N^2}\right)_j$$

is the total energy of the received signal for the $j^{th}$ transmission. $\bar{s}_{ij}$ can be approximated with the scalar value $|\bar{s}_{ij}|$ from filter 624. Also, $$\sqrt{S^2 + N^2}$$

can be measured for each data transmission or retransmission. From equation (1) the scalar value of each symbol in the packet is scaled by the gain $$G = \left(\sqrt{S^2 + N^2}\right)_j$$

before accumulation.

In the present invention, the total energy $$\sqrt{S^2 + N^2}$$

of the received signal can be computed on a frame-by-frame basis or on a symbol-by-symbol basis. Symbol-by-symbol basis allows the destination device to adjust the gain of each symbol to take into account fast changes in the channel condition.

In the present invention, the accumulation of the energy from additional retransmissions allows the destination device to correctly decode the packets received in error. The retransmission allows the communication system to operate at a higher frame-error-rate (FER) than nominal because of the ability to correctly decode the packets with a minimal expenditure of system resource, thereby improving the reliability of the data transmission and possibly increasing the capacity of the system. Furthermore, the retransmission at a subsequent time provides time diversity and improves the reliability of the data transmission. However, operating at a higher FER necessitates the retransmissions of more packets and can increase the complexity of the communication system.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for decoding a data packet comprising the steps of:

first receiving a transmission of said data packet to obtain a received packet;

second receiving at least one retransmission of said data packet to obtain retransmitted packets;

accumulating said received packet with said retransmitted packets to obtain an accumulated packet; and decoding said accumulated packet scaling code symbols of said received packet with a first gain factor;

scaling code symbols of each of said retransmitted packets with second gain factors; and combining said code symbols of said received packet with said code symbols of said retransmitted packets to obtain said accumulated packet.

2. The method of claim 1 wherein said first receiving step comprises the steps of:

demodulating at least one signal path of said transmission of said data packet to obtain first pilot signals and first filtered data symbols;

performing a dot product of said first pilot signals and said first filtered data symbols for each of said at least one signal path to obtain first scalar values; and combining said first scalar values of said least one signal path to obtain first combined scalar values; said first combined scalar values comprising said received packet.

3. The method of claim 1 wherein said second receiving step comprises the steps of:

demodulating at least one signal path of said at least one retransmission of said data packet to obtain second pilot signals and second filtered data symbols;

performing a dot product of said second pilot signals and said second filtered data symbols for each of said at least one signal path to obtain second scalar values; and combining said second scalar values of said least one signal path to obtain second combined scalar values; said second combined scalar values comprising said retransmitted packets.

4. The method of claim 1 wherein said first gain factor is defined in accordance with a signal-to-noise measurement of a received signal of said transmission and said second gain factors are defined in accordance with signal-to-noise measurements of received signals of said at least one retransmissions.

5. The method of claim 1 wherein said accumulating step comprises the steps of:

replacing selected symbols of said received packet with symbols of said retransmitted packets to obtain said accumulated packet.

6. The method of claim 1 wherein said accumulating step comprises the steps of:

interleaving symbols of said received packet with symbols of said retransmitted packets to obtain said accumulated packet; and wherein said decoding step is performed in accordance with a rate of said accumulated packet.

7. The method of claim 1 wherein said at least one retransmission of said data packet is concurrent with a transmission of a second data packet.

8. The method of claim 7 wherein said at least one retransmission of said data packet is achieved by replacing repeated symbols of said second data packet with code symbols of said data packet.

9. The method of claim 7 wherein said at least one retransmission of said data packet is achieved by encoding said second data packet with a modified code rate.

10. The method of claim 7 wherein said at least one retransmission of said data packet is achieved by transmitting said data packet on an additional code channel.

11. The method of claim 1 wherein each of said at least one retransmission is at a lower energy-per-bit than said transmission.

12. The method of claim 11 wherein each of said at least one retransmission is at a minimal energy-per-bit which still allows for correct decoding of said data packet.

13. The method of claim 12 wherein said minimal energy-per-bit is computed in accordance with a required $E_s/I_o$ and a measured $E_s/I_o$ of a received signal of said transmission.

14. The method of claim 12 wherein said minimal energy-per-bit is computed in accordance with a required $E_s/I_o$ and an accumulated $E_s/I_o$ of received signals of said transmission and said at least one retransmission.

15. The method of claim 1 wherein each of said retransmitted packets comprises a portion of said received packet.

16. The method of claim 15 wherein each of said retransmitted packets is based on a measured $E_s/I_o$ for a duration of said received packet.

17. The method of claim 1 wherein decoding step is performed for a constraint length of 9.

18. The method of claim 1 wherein decoding step is performed for a code rate of ½.

19. An apparatus for decoding a data packet comprising:

demodulation means for receiving and demodulating a transmission of said data packet to obtain a received packet and for receiving and demodulating at least one retransmissions of said data packet to obtain retransmitted packets;

accumulation means for accumulating said retransmitted packets with said received packet to produce an accumulated packet; and storage means for receiving and storing said received packet and/or said accumulated packet;

decoding means for receiving and decoding said accumulated packet;

transmission means for concurrently retransmitting said at least one retransmission of said data packet with a transmission of a second data packet and for adjusting a transmission power of said at least one retransmission of said data packet to be lower than a transmission power of said transmission of said data packet.

20. The apparatus of claim 19 further comprising:

scaling means for receiving and scaling said received packet and said retransmitted packets to produce a scaled received packet and scaled retransmitted packets;

wherein said accumulation means received and accumulate said scaled retransmitted packets with said scaled received packets to produce said accumulated packet.

* * * * *